United States Patent
Lundström (10) Patent No.: US 11,053,879 B2
(45) Date of Patent: Jul. 6, 2021

(54) METHOD AND SYSTEM FOR DIAGNOSING EXHAUST SENSORS

(71) Applicant: Scania CV AB, Södertälje (SE)

(72) Inventor: Mikael Lundström, Hägersten (SE)

(73) Assignee: Scania CV AB, Södertälje (SE)

( * ) Notice: Subject to any disclaimer, the term of this patent is extended or adjusted under 35 U.S.C. 154(b) by 319 days.

(21) Appl. No.: 16/075,948

(22) PCT Filed: Feb. 9, 2017

(86) PCT No.: PCT/SE2017/050123
§ 371 (c)(1),
(2) Date: Aug. 6, 2018

(87) PCT Pub. No.: WO2017/138873
PCT Pub. Date: Aug. 17, 2017

(65) Prior Publication Data
US 2020/0386182 A1 Dec. 10, 2020

(30) Foreign Application Priority Data

Feb. 10, 2016 (SE) .................................... 1650164-5

(51) Int. Cl.
*F01N 3/00* (2006.01)
*F02D 41/22* (2006.01)
(Continued)

(52) U.S. Cl.
CPC ......... *F02D 41/222* (2013.01); *F01N 3/2066* (2013.01); *F01N 11/00* (2013.01);
(Continued)

(58) Field of Classification Search
CPC ............... F02D 41/222; F02D 41/1441; F02D 41/1463; F02D 41/1487; F01N 3/2066; F01N 11/00
See application file for complete search history.

(56) References Cited

U.S. PATENT DOCUMENTS 6,651,422 B1 * 11/2003 LeGare ................. F01N 11/002
60/277
7,797,930 B2 * 9/2010 Kusatsugu .............. F01N 11/00
60/297
(Continued)

FOREIGN PATENT DOCUMENTS

CN 202170825 U 3/2012
CN 104033223 A 9/2014
(Continued)

OTHER PUBLICATIONS

Scania CV AB, International Application No. PCT/SE2017/050123, International Preliminary Report on Patentability, dated Aug. 14, 2018.
(Continued)

*Primary Examiner* — Gonzalo Laguarda
(74) *Attorney, Agent, or Firm* — Moore & Van Allen PLLC; W. Kevin Ransom (57) ABSTRACT

Provided is a method for diagnosing exhaust sensors, where at least one substance resulting from combustion is reduced by an additive. A first sensor intended to measure an occurrence of said substance upstream said supply of additive, and a second sensor intended to measure an occurrence of said substance downstream said supply of additive. The method comprises: determining whether the locations of said first and second sensors are reversed by: determining if a second measurement value of said second sensor exceeds a corresponding first measurement value of said first sensor at least to a first extent, and when this condition occurs, determining that the locations of said first and second sensors sensor are reversed, said measurement values are determined when a supply of additive is set to obtain at least a first reduction of said at least one substance to be reduced.

18 Claims, 6 Drawing Sheets

(51) Int. Cl.
  *F01N 3/20* (2006.01)
  *F01N 11/00* (2006.01)
  *F02D 41/14* (2006.01)

(52) U.S. Cl.
  CPC ..... *F02D 41/1441* (2013.01); *F02D 41/1463* (2013.01); *F02D 41/1487* (2013.01); *F01N 2390/02* (2013.01); *F01N 2550/05* (2013.01); *F01N 2560/026* (2013.01); *F01N 2570/14* (2013.01); *F01N 2610/02* (2013.01); *F01N 2900/0422* (2013.01)

(56) References Cited

U.S. PATENT DOCUMENTS

| | | | |
|---|---|---|---|
| 8,959,892 B2 * | 2/2015 | McCoy | F02D 41/22 60/277 |
| 2003/0163246 A1 | 8/2003 | Posselt | |
| 2005/0103000 A1 | 5/2005 | Nieuwstadt et al. | |
| 2008/0092522 A1 | 4/2008 | Tsumagari | |
| 2009/0107114 A1 * | 4/2009 | Ammineni | F02D 41/1446 60/277 |
| 2010/0218487 A1 | 9/2010 | Wang et al. | |
| 2013/0060486 A1 | 3/2013 | Takahashi et al. | |
| 2015/0113953 A1 | 4/2015 | Nilsson | |
| 2015/0176512 A1 | 6/2015 | Smith et al. | |

FOREIGN PATENT DOCUMENTS

| | | |
|---|---|---|
| DE | 10339325 A1 | 3/2005 |
| DE | 102008042289 A1 | 3/2010 |
| EP | 1124050 A2 | 8/2001 |
| EP | 1247966 A2 | 10/2002 |
| WO | 2013032398 A1 | 3/2013 |

OTHER PUBLICATIONS

Scania CV AB, European Application No. 17750522.9, Extended European Search Report, dated May 29, 2019.
International Search Report for International Patent Application No. PCT/SE2017/050123 dated Apr. 20, 2017.
Written Opinion of the International Searching Authority for International Patent Application No. PCT/SE2017/050123 dated Apr. 20, 2017.
Swedish Office Action of Swedish Patent Application No. 1650164-5 dated Sep. 1, 2016.
Scania CV AB, Korean Application No. 10-2018-7024935, Office Action, dated Oct. 15, 2019.
Scania CV AB, Chinese Application No. 201780009755.X, First Office Action, dated Nov. 26, 2019.

* cited by examiner

METHOD AND SYSTEM FOR DIAGNOSING EXHAUST SENSORS

CROSS-REFERENCE TO RELATED APPLICATION(S)

This application is a National Stage Application (filed under 35 § U.S.C. 371) of PCT/SE2017/050123, filed Feb. 9, 2017 of the same title, which, in turn claims priority to Swedish Application No. 1650164-5 filed Feb. 10, 2016 of the same title; the contents of each of which are hereby incorporated by reference.

FIELD OF THE INVENTION

The present invention relates to combustion processes, and in particular to a method and system for diagnosing exhaust sensors subjected to exhaust gases resulting from combustion. The present invention also relates to a vehicle, as well as a computer program product that implement the method according to the invention.

BACKGROUND OF THE INVENTION

With regard to vehicles in general, and at least to some extent heavy/commercial vehicles such as trucks, buses and the like, there is constantly ongoing research and development with regard to increasing fuel efficiency and reducing exhaust emissions.

This is often at least partly due to growing governmental concern in pollution and air quality, e.g. in urban areas, which has also led to the adoption of various emission standards and rules in many jurisdictions.

These emission standards often consist of requirements that define acceptable limits for exhaust emissions of vehicles being provided with internal combustion engines. For example, the exhaust levels of e.g. nitrogen oxides ($NO_x$), hydrocarbons (HC), carbon monoxide (CO) and particles are regulated for most kinds of vehicles in these standards.

The undesired emission of substances can be reduced by reducing fuel consumption and/or through the use of aftertreatment (purifying) of the exhaust gases that results from the combustion process.

Exhaust gases from the internal combustion engine can, for example be treated through the use of a so-called catalytic process. There exist various kinds of catalytic converters, where different types can be used for different kinds of fuel and/or for treatment of different kinds of substances occurring in the exhaust gas stream. With regard to nitrogen oxides $NO_x$ (such as nitric oxide NO and nitrogen dioxide $NO_2$), for example, heavy vehicles often comprise a method where an additive is supplied to the exhaust gas stream. The additive is supplied in order to, usually through the use of a catalytic converter, reduce the presence of nitrogen oxides $NO_x$ to less pollutive substances (mainly nitrogen and water vapour).

One common kind of catalytic converter that is used in $NO_x$ reduction, where an additive, oftentimes urea based, is added to the exhaust gas stream, is Selective Catalytic Reduction (SCR) catalytic converters.

In the supplying of an additive for reduction of substances in an exhaust gas stream it is essential that the amount of additive that is supplied to the exhaust gas stream is neither too great nor too small. Consequently, it is desirable that the actually supplied amount of additive corresponds to an expected/desired amount of additive. Further, with regard to the reduction it is also important that the additive consists of an additive of an expected kind.

Evaluation of such reduction is often performed using one or more sensors being subjected to the exhaust gas stream. Hence, proper operation of the one or more sensors is important when evaluating reduction.

SUMMARY OF THE INVENTION

It is an object of the present invention to provide a method and system that may facilitate identification of the cause of improper operation in aftertreatment systems.

According to the present invention, it is provided a method for diagnosing exhaust sensors subjected to exhaust gases resulting from combustion, wherein an aftertreatment system is arranged for reduction of at least one substance resulting from said combustion by supplying an additive comprising a reagent to an exhaust gas stream resulting from said combustion, wherein a first exhaust sensor is subjected to the exhaust gas stream and intended to measure an occurrence of said at least one substance at a location upstream said supply of additive, and a second exhaust sensor being subjected to the exhaust gas stream and intended to measure an occurrence of said at least one substance at a location downstream said supply of additive. The method includes:
  determining whether the locations of said first and second sensor are reversed, the determination comprising:
  determining if a second measurement value of said second sensor exceeds a corresponding first measurement value of said first sensor at least to a first extent, and when said second measurement value of said second sensor exceeds said corresponding first measurement value of said first sensor at least to said first extent, determining that the locations of said first and second sensor are reversed, wherein said measurement values are determined when a supply of additive is set to obtain at least a first reduction of said at least one substance to be reduced.

The occurrence of said at least one substance in the exhaust gas stream may be determined as an amount of said substance occurring in the exhaust gas stream, where the amount can be arranged to be accumulated over time. The exhaust gas stream may be an exhaust gas stream resulting from combustion in an internal combustion engine in a vehicle.

As was mentioned above, the presence of at least some substances (as is explained below, in the present description and claims, the term substance includes compounds as well) in an exhaust gas stream resulting from combustion can be reduced through the supply of an additive to the exhaust gas stream. A reagent of the additive then reacts with one or more of the substances occurring in the exhaust gas stream to thereby form less hazardous substances.

For example, the supply of additive can be used to reduce the concentration of nitrogen oxides $NO_x$ or other substances in exhaust gases resulting from combustion, where the additive can include a reagent in the form of e.g. urea. It is, however, important that reagent is supplied to the exhaust gas stream in a proportion that corresponds to the presence of the one or more substances/compositions that is to be reduced in order to achieve the desired effect. It is also important that the additive comprises reagent of a kind that is capable of performing the desired reduction. If a wrong kind of reagent/additive is supplied, and/or if the supplied amount of reagent/additive is too small in relation to the presence of the substance/composition to be reduced, undesired surplus of the substance may still remain after the reduction and be emitted into the surroundings.

The supply of additive is in general performed on the basis of the occurrence of the substance to be reduced upstream the supply of additive. This occurrence can be determined using a sensor being subjected to the exhaust gas stream, where the presence indicated by the sensor can be used as input to an algorithm for calculating a suitable amount of additive to accomplish a desired reduction. A second sensor can be used to verify the reduction by measuring the occurrence of the substance downstream the supply of additive and preferably downstream any catalytic converter(s) being used in the reduction.

If the reduction deviates from an expected reduction, the supply can, in general, be corrected using a correction mechanism. That is, it is determined whether the supplied amount actually corresponds to the expected/required amount of supplied additive, and, when found necessary, the supply is corrected. The correction hence compensates the predetermined amount, or quantity, to be injected for factors that differ from what is expected. The correction, however, is in general limited with regard to extent to which the intended amount can be corrected. For example, the correction is in general limited to e.g. 10-100%, such as 50%, of the determined amount to be supplied. Hence, correction can only be performed to a limited extent.

Sensors of the kind being used upstream and downstream the supply of additive are in general very similar, and, for example, during assembly of aftertreatment components these sensors may be easily mixed-up. For example, the sensors may differ visually e.g. only in colour of cable or sensor, and/or cable length, and if the mistake during assembly is not immediately discovered, a period of usage of e.g. a vehicle may result in dirt and dust hiding differences in colour. In order to be distinguishable by a control system the sensors in general have different identities (IDs). For example, the sensors may be provided with an identity code, where one range of identity codes may be used by the control system to identify the sensor as the sensor being located upstream the supply of additive, while another, e.g. non-overlapping, range of identity codes may be used to identify the sensor as the sensor being located downstream the supply of additive.

Alternatively, each sensor may be connected to a dedicated socket, in which case identification of the sensor may be provided by the particular socket to which it is intended to be connected.

If the sensors have been mixed-up and installation positions have been reversed during assembly, this will, as will be further explained in the detailed description below, result in improper operation of the reduction of the substance to be reduced. If the reduction between the upstream sensor and downstream sensor is insufficient due to reversed sensors, the actual reason for the supply of additive not working properly may not be easily established. Instead, various faults other than the sensors being reversed may be indicated. Thereby the actual reason for improper reduction may not be detected by the control system. Instead, problems with the reduction that in reality is caused by faulty sensor locations may instead indicate faults related to other functions of the reduction. For example, the system may assume that the quality of additive is inferior, e.g. comprising an insufficient amount of reagent or reagent of a wrong kind. Also, it may be assumed that injection of additive is malfunctioning, and/or that a catalytic converter being used in the reduction is malfunctioning. Such erroneous fault indications may prolong fault tracing and misguide a service person towards assumed malfunctions of components that in reality is operating properly.

For example, in order to check whether the $NO_x$ sensors are operating properly, the supply of urea can be turned off, in which case the sensors are assumed to show the same occurrence NOx in the exhaust gas stream. This, however, does not reveal problems with reversed sensors. Instead, as mentioned, other faults may be indicated.

According to the present invention, it is determined whether the sensors upstream and downstream the supply of additive, respectively, have been mixed-up during assembly and the sensor positions been reversed. This determination is described below.

According to embodiments of the invention, when the sensors are determined to have been mixed up, the use of the sensor signals from the reversed sensors in the control system, such as a vehicle control system, may be switched so as to allow functionality depending on signals from these sensors to use the sensor signals as if the sensors were actually correctly positioned in relation to the supply of additive in the exhaust gas stream.

That is, sensor signals from the sensor that in reality is located upstream the supply of additive may according to embodiments of the invention be treated as sensor signals from a sensor having this location, and vice versa. For example, the identities of the sensors can be reversed in the control system.

Also, when the sensors are determined to have been mixed up, appropriate diagnostic trouble codes can be set so that the sensor locations can be attended to when the vehicle is taken in for service. In this way, problems with reversed sensors can be essentially completely mitigated with regard to the control system functions utilizing signals from these sensors. Hence, vehicle performance can be substantially maintained, and thereby the vehicle can continue operation until e.g. the next time the vehicle is scheduled for service.

For example, since the invention enables systems such as the reduction of substances in the exhaust gas stream to use sensor signals from the actually intended sensor location, proper reduction can be ensured. In this way, proper system performance may be maintained so that e.g. legislative restrictions in vehicle performance due to e.g. insufficient treatment of exhaust emissions can be avoided.

With regard to the determination whether the sensors have been reversed this is performed by determining if a second measurement value of the second sensor exceeds a corresponding first measurement value of the first sensor at least to a first extent, and when this is the case the locations of the first and second sensor are determined as reversed. However, it is further required that the measurement values are determined when a supply of additive is set to obtain at least a first reduction of the at least one substance to be reduced. In this way, it can be ascertained a difference in measurement values that will make it possible to detect if the sensors have been reversed.

For example, the reduction can be set to a level that is expected to result in a difference between said first and second measurement values exceeding possible differences caused by tolerances in sensor accuracy.

In this way, it can be ensured that the respective measurement values of each of the sensors, due to the reduction that will occur from the supply of additive, will differ to an extent exceeding possible differences caused e.g. by sensor tolerances. For example, with regard to $NO_x$ sensors, the tolerances can be relatively high, so that two sensors measuring the same occurrence of the at least one substance to be reduced may differ substantially in the provided result. Such differences can be accounted for by ensuring that the impact on measurements of the supply of additive will exceed the possible differences caused by tolerances so that an unambiguous result regarding actual sensor location can be obtained.

According to embodiments of the invention, the reduction of said at least one substance is set to a level that results in a reduction of said at least one substance that is equivalent to a reduction in percent that at least equals or exceeds: $(((1,A)*(1,B))-1)*100$, where A is the tolerance in sensor accuracy of said first sensor expressed in percent, and B is the tolerance in sensor accuracy of said second sensor expressed in percent. In this way reversed sensors can be detected even if the tolerances are the most unfavourable from a detection point of view.

A measure of the substance to be reduced can be accumulated for each of the sensors, i.e. the sensor presumably being located upstream the supply of additive and the sensor presumably being located downstream the supply of additive. In addition, this accumulation can be performed for a period during which a first amount of additive is supplied to the exhaust gas stream.

The length of the period can be arranged to be determined by any one or more from the group:
- a period of time,
- a period during which an accumulated work produced by an internal combustion engine amounts to a first amount of work during accumulation, and
- an accumulation of reagent and/or additive being supplied to the exhaust gas stream amounting at least to a first amount of reagent/additive.

The supplying of said first additive can be arranged to be performed upstream a first catalytic converter. This catalytic converter can be arranged to be a selective catalyst reduction (SCR) catalytic converter. Likewise the sensor located downstream the supply of additive is preferably located downstream the catalytic converter when present.

Furthermore, the substance being reduced can be any substance, and the sensors can be any sensors measuring a substance being reduced. According to embodiments of the invention, the substance being reduced is at least nitrogen oxides $NO_x$. The sensors may constitute sensors suitable for measuring occurrence of nitrogen oxides, $NO_x$.

The invention also relates to a system corresponding to the methods set forth above. The system is characterised in means carrying out features of the invention. Such means for carrying out features of the invention can consist of any suitable means, and the means can be specifically adapted to perform the features set forth in the system claims. Such means can consist of one or more control units, or other electrical, mechanical and/or electromechanical elements or arrangements.

Further characteristics of the present invention and advantages thereof are indicated in the detailed description of exemplary embodiments set out below and the attached drawings.

DETAILED DESCRIPTION OF THE INVENTION

In the following detailed description, the present invention will be exemplified for a vehicle. The invention is, however, applicable also for other kinds of transportation means, such as air and water crafts. The invention is also applicable to fixed installations.

Furthermore, the present invention is exemplified below in connection with supply of a urea based additive for reduction of nitrogen oxides. The present invention is, however, applicable for any kind of system where an additive is supplied, where the additive can be arranged for reduction of any substance/compound in the exhaust gas stream, and hence not necessarily nitrogen oxides.

Further, in the present description and the appended claims the expression "substance" is defined to include chemical compounds, compositions and mixtures.

Figure 1A:
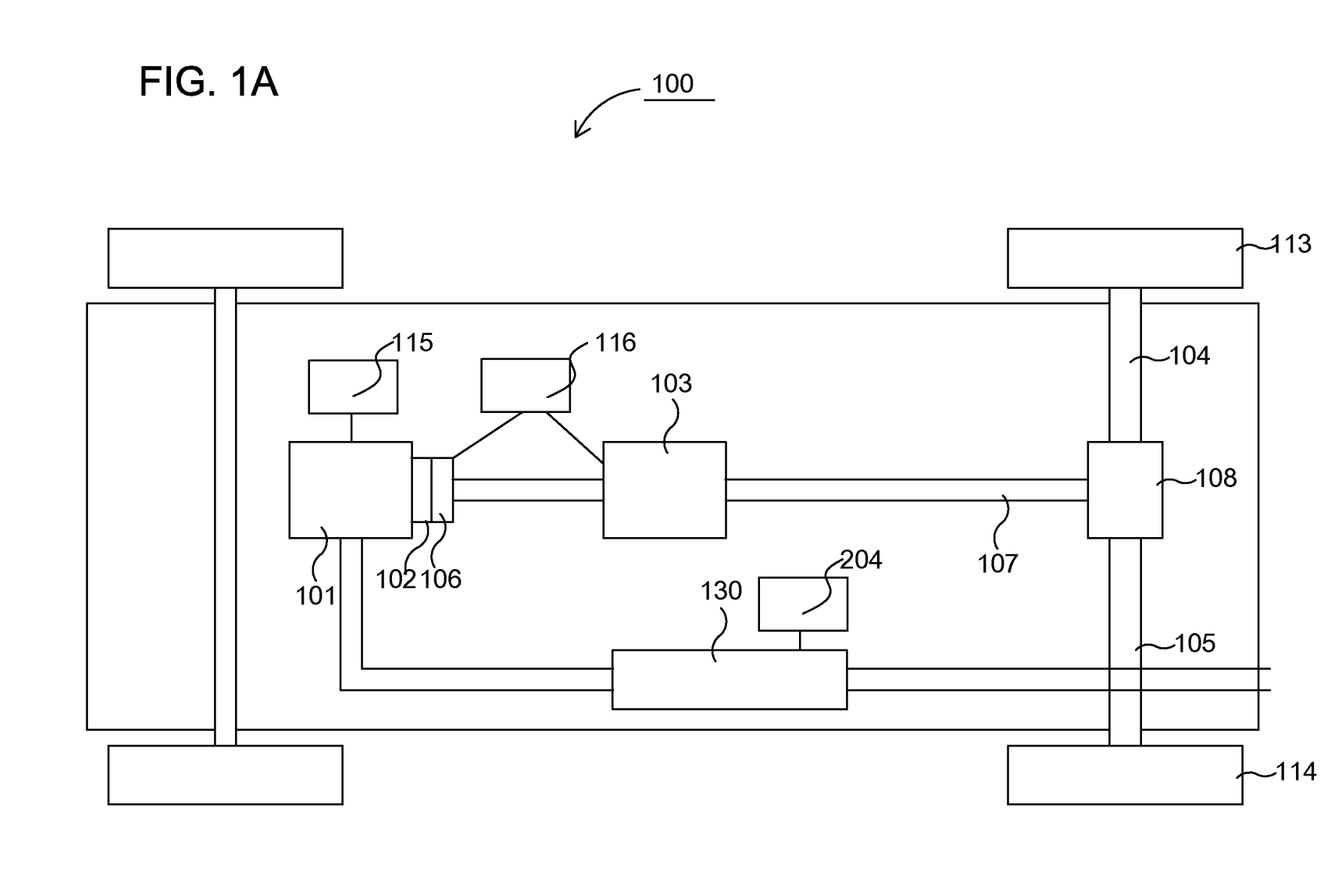
FIG. 1A illustrates a powertrain of an exemplary vehicle in which embodiments of the invention advantageously can be utilized.

FIG. 1A schematically depicts a powertrain of an exemplary vehicle 100. The powertrain comprises a power source, in the present example an internal combustion engine 101, which, in a conventional manner, is connected via an output shaft of the internal combustion engine 101, normally via a flywheel 102, to a gearbox 103 via a clutch 106. An output shaft 107 from the gearbox 103 propels drive wheels 113, 114 via a final gear 108, such as a common differential, and half shafts 104, 105 connected to said final gear 108.

The internal combustion engine 101 is controlled by the vehicle control system via a control unit 115. The clutch 106 and gearbox 103 are also controlled by the vehicle control system by means of a control unit 116.

FIG. 1A, consequently, discloses a powertrain of a specific kind, but the invention is applicable in any kind of powertrain and also e.g. in hybrid vehicles. The disclosed vehicle further comprises an aftertreatment system 130 for aftertreatment (purifying) of exhaust gases that results from combustion in the internal combustion engine 101. The functions of the aftertreatment system 130 are controlled by means of a control unit 204.

The aftertreatment system 130 can be of various kinds and designs, and according to the disclosed embodiment an additive is supplied to the exhaust gas stream. An exemplary aftertreatment system 130 in which the present invention can be utilized is shown more in detail in FIG. 2, and in the disclosed exemplary embodiment, the aftertreatment system 130 comprises a selective catalytic reduction (SCR) catalytic converter 201. The aftertreatment system can also comprise further non-disclosed components, such as, for example, further catalytic converters and/or particle filters which can be arranged upstream or downstream the SCR catalytic converter 201.

The supply of additive can, according to the above, for example, be used in the reduction of the concentration of nitrogen oxides $NO_x$ in the exhausts from the internal combustion engine through the use of an SCR catalytic converter.

This additive can, as according to the disclosed embodiment, inter alia be an additive comprising urea as reagent and e.g. consist of AdBlue which constitutes a frequently used additive and which consists of a mixture of approximately 32.5% urea dissolved in water. Urea forms ammonium when heated, and the ammonium then reacts with nitrogen oxides $NO_x$ in the exhaust gas stream. The present invention is applicable when using AdBlue, as well as when using any other urea based additive. As was mentioned above, the invention is also applicable when using any kind of additive comprising other reagents, and where any suitable substance in the exhaust gas stream is reduced/treated using the additive.

Figure 2:
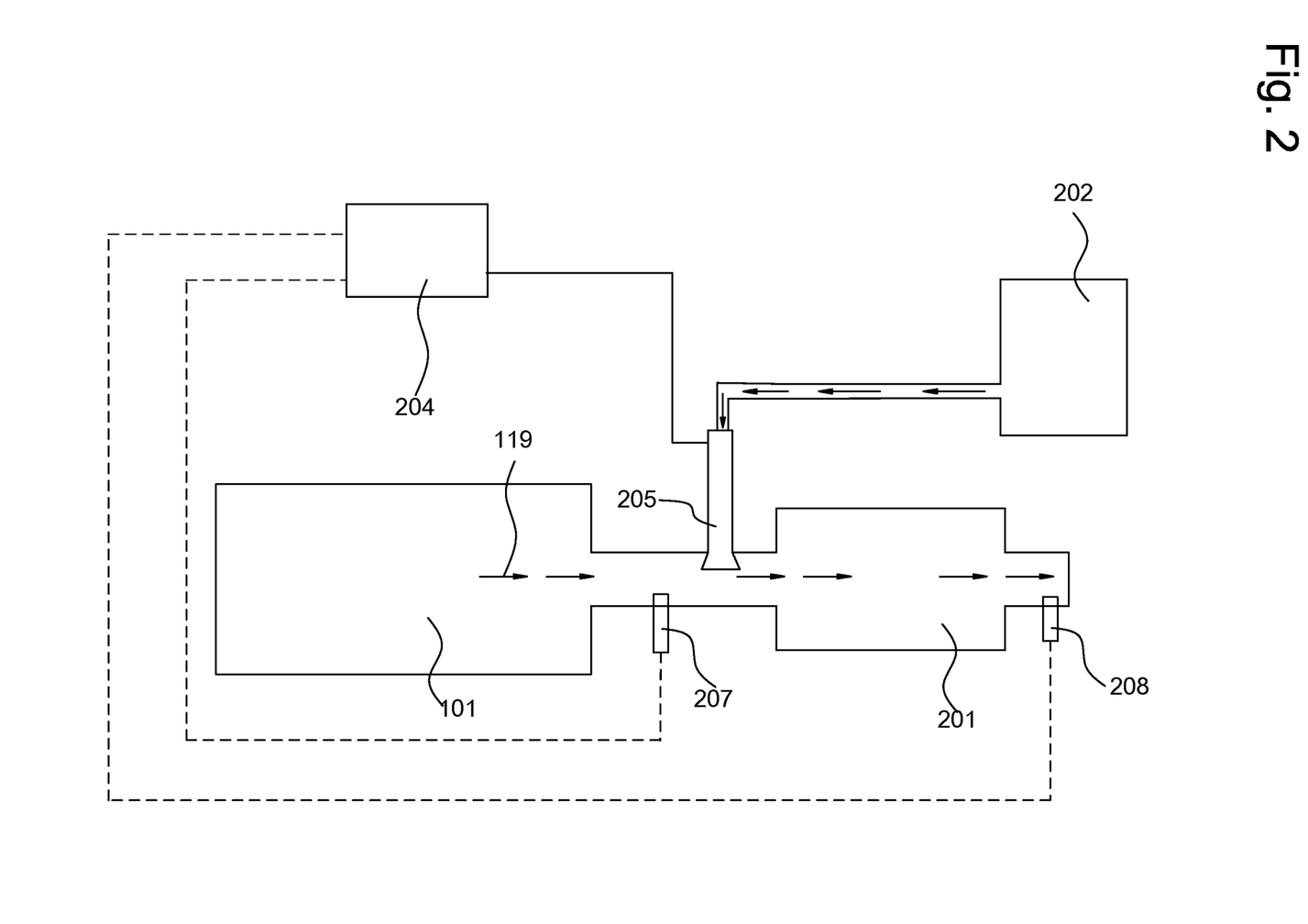
FIG. 2 illustrates an example of an aftertreatment system where a supply of additive is utilized and with which embodiments of the invention advantageously can be utilized.

Apart from said catalytic converter 201, FIG. 2 further discloses an additive dosing system, in the disclosed example a urea dosing system (UDS), which comprises a urea, or dosing, tank 202, which is connected to an injection nozzle 205 through the use of which additive is injected into the exhaust gas stream 119. The dosing of urea is controlled by a control unit 204 controlling exhaust gas aftertreatment, which generates control signals for controlling the supply of additive so that a desired amount is injected into the exhaust gas stream 119 from the tank 202 using the injection nozzle 205.

Dosing systems for the supply of additive are in general well described in the prior art, and the precise manner in which the supply of additive is dosed/performed is therefore not described in detail herein. The dosing may be subject to adaptation, or correction. In the following the term correction is used, and correction can be performed e.g. at regular intervals and aims to ensure that the injected amount of additive corresponds to the demand. In general, the dosing varies, in principle, continuously as the operating conditions changes and the generation, in this example, of nitrogen oxides therewith.

The dosing is in general performed on the basis of the presence of the substance to be reduced upstream the supply of additive. The presence of $NO_x$ upstream the supply of additive and downstream the catalytic converter 201 and hence downstream the supply of additive, respectively, can, for example, be determined through the use of $NO_x$ sensors 207, 208.

Sensor signals from sensor 208 can be used to determine whether a desired conversion, i.e. reduction, is taking place and thereby whether the supply of additive can be assumed to be performed in a desired manner.

The amount of additive actually needed may in reality differ from the predetermined amount. For example, the quality/concentration of the additive may differ from the quality/concentration of the additive for which dosing amounts were determined. Also, e.g. wear and/or aging and/or faulty components, such as the catalytic converter, may affect the actual amount being injected. In order to account for factors of this kind adaptation, or correction, can be performed, where e.g. a correction factor is applied to account for such variations.

Such correction may usually be performed until a maximum limit has been reached. When the maximum limit has been reached it is considered that no further correction can be performed by further increasing the injected quantity.

However, as has been explained above, proper functionality with regard to supply of additive and correction requires that said sensor signals actually represent measurements from the position in the exhaust gas stream where the sensors presumably are located.

The invention relates to a method for diagnosing exhaust sensors subjected to exhaust gases resulting from combustion. In particular, the invention provides a method where it is determined whether two sensors being subjected to an exhaust gas stream have been reversed, i.e. interchanged. Further, according to embodiments of the invention, if this is the case, sensor signals from the sensors may be reversed such that sensor signals from the sensors instead are interpreted, defined, as if the sensor locations where reversed. In this way, e.g. a control system such as a vehicle control system can use the sensor signals as had the sensors been located at their intended positions to ensure proper functionality until the sensors can be properly relocated.

Figure 3:
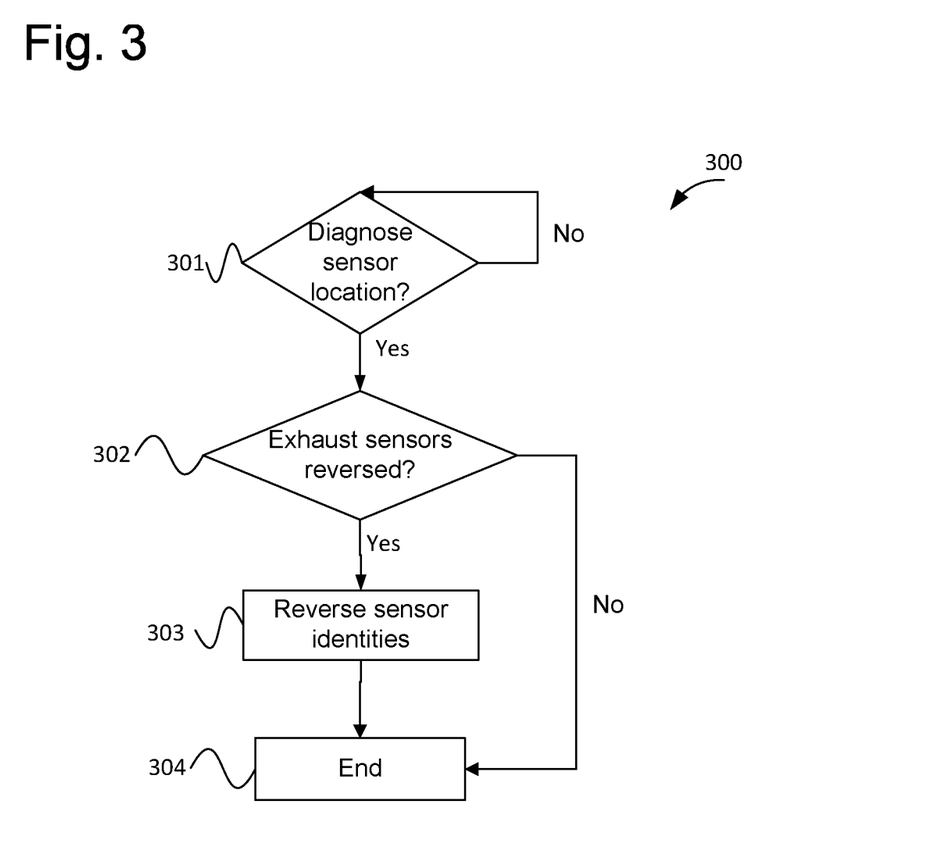
FIG. 3 illustrates an exemplary method for reversing sensor signals.

An exemplary method 300 regarding reversing the sensor signals is shown in FIG. 3, which method can be implemented at least partly e.g. in the control unit 204 for controlling aftertreatment of exhaust gases. Similarly, the method according to embodiments of the invention disclosed in FIG. 5 can be implemented at least partly e.g. in the control unit 204. As indicated above, the functions of a vehicle are, in general, controlled by a number of control units, and control systems in vehicles of the disclosed kind generally comprise a communication bus system consisting of one or more communication buses for connecting a number of electronic control units (ECUs), or controllers, to various components on board the vehicle. Such a control system may comprise a large number of control units, and the control of a specific function may be divided between two or more of them.

For the sake of simplicity, FIGS. 1A, 2 depicts only control units 115-116, 204, but vehicles 100 of the illustrated kind are often provided with significantly more control units, as one skilled in the art will appreciate. Control units 115-116, 204 are arranged to communicate with one another and various components via said communication bus system and other wiring, partly indicated by interconnecting lines in FIG. 1A.

The present invention can be implemented in any suitable control unit in the vehicle 100, and hence not necessarily in the control unit 204. The sensor diagnostics according to the present invention will usually depend on signals being received from other control units and/or vehicle components, and it is generally the case that control units of the disclosed type are normally adapted to receive sensor signals from various parts of the vehicle 100. The control unit 204 will, for example, receive signals from $NO_x$ sensors 207, 208 and possibly data relating e.g. to the work being produced by the combustion engine. Control units of the illustrated type are also usually adapted to deliver control signals to various parts and components of the vehicle, e.g. to the engine control unit or other suitable control unit when tests indicate that performance of the vehicle should be restricted.

Control of this kind is often accomplished by programmed instructions. The programmed instructions typically consist of a computer program which, when executed in a computer or control unit, causes the computer/control unit to exercise the desired control, such as method steps according to the present invention. The computer program usually constitutes a part of a computer program product, wherein said computer program product comprises a suitable storage medium 121 (see FIG. 1B) with the computer program 126 stored on said storage medium 121. The computer program can be stored in a non-volatile manner on said storage medium. The digital storage medium 121 can, for example, consist of any of the group comprising: ROM (Read-Only Memory), PROM (Programmable Read-Only Memory), EPROM (Erasable PROM), Flash memory, EEPROM (Electrically Erasable PROM), a hard disk unit etc, and be arranged in or in connection with the control unit, whereupon the computer program is executed by the control unit. The behaviour of the vehicle in a specific situation can thus be adapted by modifying the instructions of the computer program.

Figure 1B:
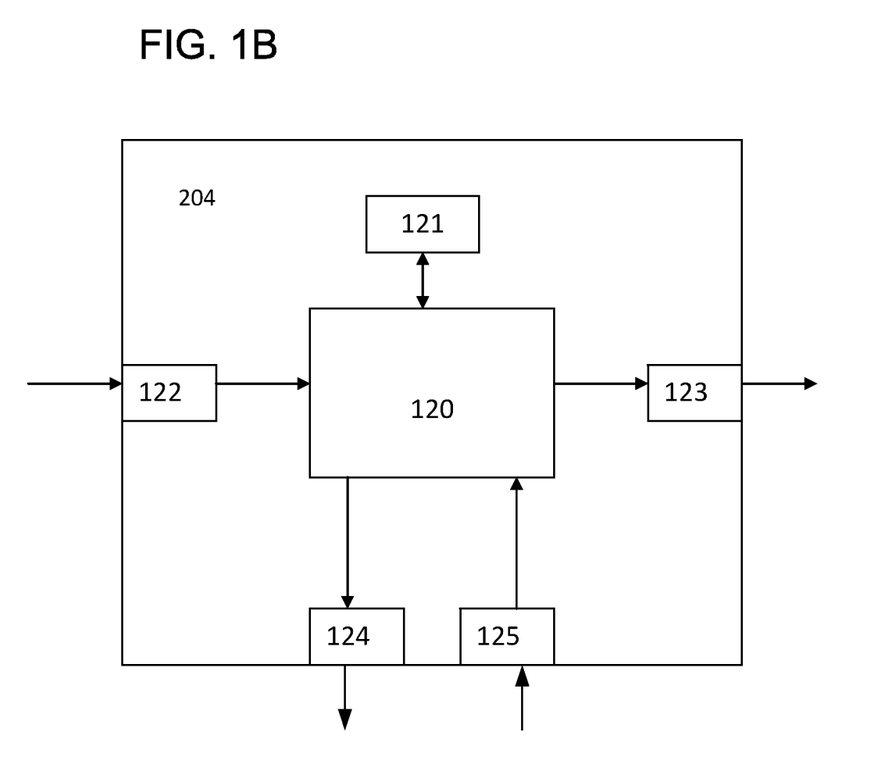
FIG. 1B illustrates an example of a control unit in a vehicle control system.

An exemplary control unit (the control unit 204) is shown schematically in FIG. 1B, wherein the control unit can comprise a processing unit 120, which can consist of, for example, any suitable type of processor or microcomputer, such as a circuit for digital signal processing (Digital Signal Processor, DSP) or a circuit with a predetermined specific function (Application Specific Integrated Circuit, ASIC). The processing unit 120 is connected to a memory unit 121, which provides the processing unit 120, with e.g. the stored program code 126 and/or the stored data that the processing unit 120 requires to be able to perform calculations. The processing unit 120 is also arranged so as to store partial or final results of calculations in the memory unit 121.

Furthermore, the control unit 204 is equipped with devices 122, 123, 124, 125 for receiving and transmitting input and output signals, respectively. These input and output signals can comprise waveforms, pulses or other attributes that the devices 122, 125 for receiving input signals can detect as information for processing by the processing unit 120. The devices 123, 124 for transmitting output signals are arranged so as to convert calculation results from the processing unit 120 into output signals for transfer to other parts of the vehicle control system and/or the component (s) for which the signals are intended. Each and every one of the connections to the devices for receiving and transmitting respective input and output signals can consist of one or more of a cable; a data bus, such as a CAN bus (Controller Area Network bus), a MOST bus (Media Oriented Systems Transport) or any other bus configuration, or of a wireless connection.

Returning to the exemplary method 300 illustrated in FIG. 3, the method starts in step 301, where it is determined whether sensor location is to be diagnosed. The method remains in step 301 for as long as this is not the case. The method continues to step 302 when it is determined that the sensor location is to be diagnosed. The transition from step 301 to step 302 can, for example, be initiated according to various criteria. For example, the diagnostics can be arranged to be performed each time there is an indication of an error in the supply of additive, when certain types of errors in the supply of additive is indicated and/or when there is an indication that reduction is insufficient.

As has been mentioned above and will be explained further in the following, if the locations of the sensors 207, 208 accidentally have been reversed and hence are located on each other's intended positions, this will give rise to behaviours that, in turn, may cause setting of various trouble codes regarding the supply of additive.

As was also mentioned above, the supply of additive is oftentimes controlled on the basis of the presence of the substance to be reduced upstream the supply of additive. This means that if the sensors accidentally have been reversed, the supply will unintentionally be based on sensor signals from the sensor being located downstream the supply of additive.

Consequently, when additive is supplied, the reduction will reduce the occurrence of $NO_x$ downstream the supply. However, since this will be taken as the occurrence in the exhaust gases upstream the supply of additive, due to the misplaced sensor, the reduced occurrence will be taken as a reduced production of $NO_x$ in the combustion engine, with the result that supply of additive is reduced instead of being increased further as would in reality be required to obtain the desired reduction. This is exemplified for illustrative purposes in FIG. 4, which shows a scenario of the reduction when the sensors upstream and downstream the supply of additive has been reversed.

Figure 4:
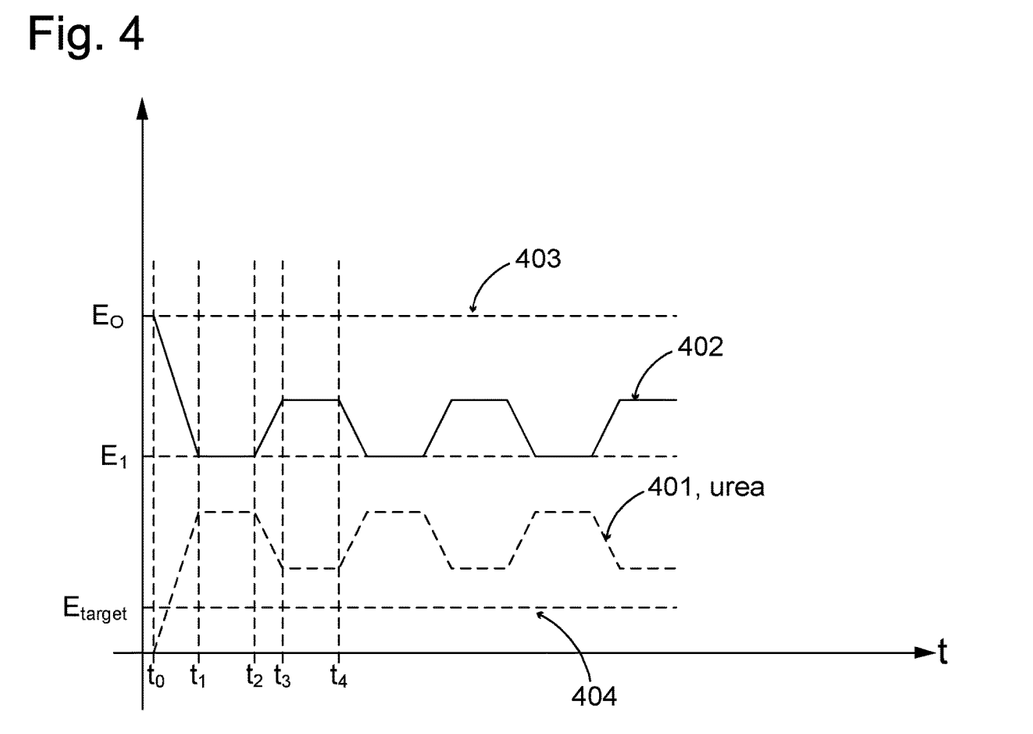
FIG. 4 illustrates variations in supply of additive over time.

FIG. 4 discloses changes in time for the supply of additive, indicated by dashed line 401. Further, solid line 402 represents measurements from the sensor that in reality is located downstream the supply of additive, and dashed line 403, which for purposes of illustration is a constant line in this example, represents signals from the sensor that the system believes is the sensor located downstream the supply of additive but which in reality represents emissions upstream the supply of additive and hence emissions from the internal combustion engine 101. Dashed line 404 represents the target reduced $NO_x$ level, i.e. target level to be measured by sensor 208, and e.g. representing a level required to fulfil legislation.

At system startup, t=t0, there is no injection of additive (urea) and the NOx emission levels are, assuming that no reagent is stored in the catalytic converter 201, the same both upstream and downstream the point of supply of additive. Consequently, the system determines that there is a need for supply of additive to reduce the emission to approved levels and substantially at t=t0 supply of additive is commenced. At time t=t1 reduction of $NO_x$ using the additive has commenced and the levels indicated by $NO_x$ sensor 208 in FIG. 2 which according to the above the system believes is sensor 207 has decreased to a level $E_1$. As was mentioned above, the supply of additive is in general controlled as a function of the occurrence of $NO_x$ leaving the engine, engine-out $NO_x$. That is, the occurrence of the substance at the (assumed) position of sensor 207 in FIG. 2. This means that when sensor 208 is taken as the sensor indicating engine out $NO_x$ the system comes to the conclusion that engine-out $NO_x$ has been reduced, and therefore the need for additive should also be reduced.

Because of this, at $t=t_1$, the increase in supply of additive is stopped and at $t=t_2$ a reduction in the supply of additive is commenced even though the actual emission level still is far higher than the desired level indicated by $E_{target}$ in FIG. 4. As a result, the resulting $NO_x$ levels measured by sensor 208 will begin to increase. This in turn, makes the system believe that the engine out $NO_x$ levels increases, so that at time $t_3$ the amount of additive being supplied is not further decreased but instead, at $t_4$, the amount of supplied additive will again be increased in response to the increased engine out levels.

Consequently, when the $NO_x$ sensors have been reversed the system will exhibit an oscillating, cyclic, behaviour of the kind shown in FIG. 4 and it may not be apparent for the control system to determine the reason for the system behaving as it does. The determination of the supply of additive may also comprise an influence of the measured $NO_x$ downstream the supply, which according to the example is very high, but the possible correction using this factor is in general limited e.g. to 10-100% of the already determined amount. The resulting injection of additive will therefore be far too small to obtain the desired reduction even when a maximum correction factor is applied.

Since sensor signals from sensors 207, 208 may be used also by other functionality in the control system, e.g. to determine whether the vehicle fulfils set criteria regarding emission levels, the reversed sensors may cause various undesired effects, such as vehicle performance being restricted (reduced) by the control system due to the vehicle not fulfilling legislative requirements. According to embodiments of the invention problems of this kind are solved or at least mitigated by a system where it is determined by means of signals from sensors 207, 208 whether the sensors have been reversed. This is performed in step 302 of FIG. 3.

If it is determined in step 302 that the sensors in fact are reversed, the method continues to step 303 where the sensor signals are "reversed" in the control system so that any functionality utilizing sensor signals from sensors 207, 208 automatically will use sensor signals from a sensor at a correct location in the system irrespective of whether sensors have been reversed during assembly. Simultaneously, any suitable diagnostic trouble codes may be set so that the system can be corrected e.g. by physically relocating the sensors and resetting the control system in this regard when the vehicle is taken in for service. The method is then ended in step 304. If it is determined in step 302 that the sensors have not been reversed the method may be ended or return to step 301. In this case other fault detection mechanisms may disclose other kinds of problems.

A method according to embodiments of the invention for determining whether the sensors have been reversed will be disclosed in the following with reference to FIG. 5.

Figure 5:
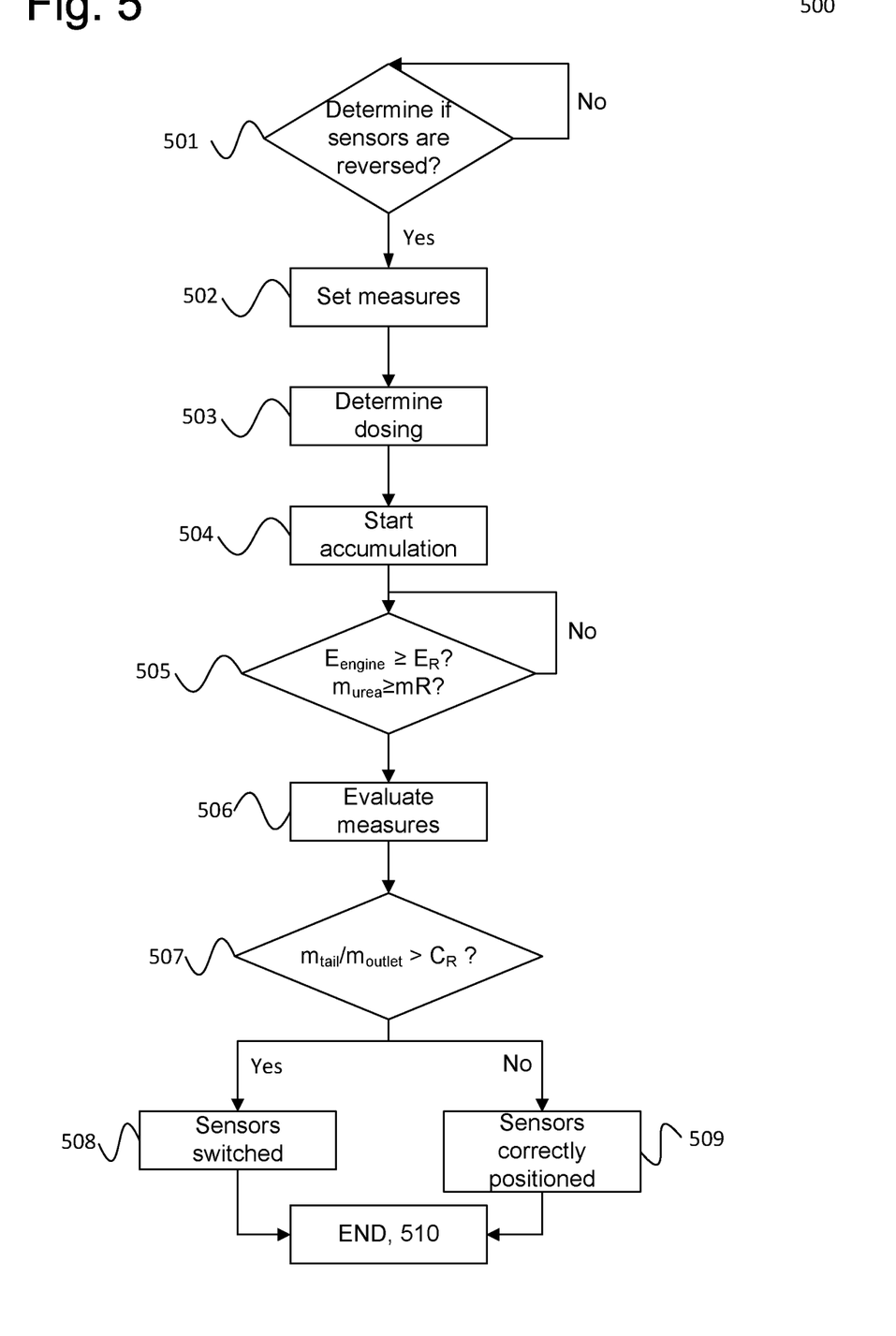
FIG. 5 illustrates an exemplary method according to embodiments of the invention for determining whether sensors are reversed.

The method 500 of FIG. 5 for determining whether the sensors have been reversed starts in step 501, where the method remains until it is to be determined whether the sensors are reversed, which can be initiated, e.g., by the method of FIG. 3, or by any other trigger. For example, the method according to FIG. 5 can be arranged to be carried out when any or certain types of faults in the aftertreatment are indicated.

In step 502 a set of measures are set to initial values, e.g. zero. These measures include:

$m_{outlet}$: a measure representing an accumulation of $NO_x$ at an assumed location upstream the supply of additive, i.e. an accumulation of the $NO_x$ leaving the combustion engine, $m_{tail}$: a measure representing an accumulation of $NO_x$ at the assumed position of sensor 208, i.e. downstream the supply of additive and essentially representing the amount of $NO_x$ discharged to the ambient air of the vehicle, and $UREA_{acc}$: a measure representing the amount of additive, in this example urea, that has been supplied to the exhaust gas stream during accumulation of $m_{outlet}$, $m_{tail}$.

The additive can be arranged to be supplied according to the above, i.e. in dependence of the (presumed) occurrence of $NO_x$ upstream the supply. According to one embodiment, the supply can be arranged to be based on sensor signals from the sensor that is interpreted as being the sensor downstream the supply of additive, since, in case the sensors in fact are reversed, a higher amount of additive will be supplied when dosing is based on signals from this sensor.

In step 503 dosing of additive is set to a dosing that is presumed to reduce $NO_x$ at least to a predetermined extent. For example, the dosing of additive can be set to an amount that is expected to reduce the occurrence of $NO_x$ e.g. at least by 35% or to any other suitable degree. This step can be omitted e.g. in case intended reduction is always set to some level, or set in any other way. The reduction is set to a level that accounts for measurement differences that might prevail due to tolerances in sensor accuracy.

According to embodiments of the invention, the reduction can be set to a level that results in a reduction of the occurrence of $NO_x$ that may be determined in any suitable way but that is equivalent to a reduction, expressed in percent, that at least equals or exceeds:

$(((1,A)*(1,B))-1)*100$, where

A is the tolerance in sensor accuracy of one of the sensors expressed in percent, and B is the tolerance in sensor accuracy of the other sensor expressed in percent.

For example, $NO_x$ sensors may have a tolerance in accuracy of e.g. 15%, and if the sensors are at different extremes in terms of accuracy, this factor alone may render a difference in accumulated $NO_x$ in the order of 30%. In particular, using the above relation with A=15 (15% accuracy) results in a possible difference of 1.15*1.15=1.32=32% from two sensors subjected to the same exhaust gas stream. According to embodiments of the invention, at least this reduction is set.

In step 504 accumulation is started, and in step 505 it is determined whether the work $E_{engine}$ produced by the combustion engine during accumulation has reached a work $E_R$. This work can be set to some suitable level, e.g. some suitable number of kWh, e.g. in the order of 10-100 kWh, to ensure that representative measurements are obtained. If too small amounts of additive are supplied the tolerances of the sensors may provide unreliable results. Alternatively, or in addition, it can be determined if a minimum amount of additive $m_{urea}$ since start of accumulation amounts to or exceeds an amount $m_{urea,min}$ representing an amount which is considered large enough to ensure that the reduction resulting from the supply of additive will have a desired impact on the measures $m_{outlet}$ and $m_{tail}$ above. Also, accumulation can be arranged to be performed until any of $m_{outlet}$ and $m_{tail}$ reaches a set limit provided the reduction is set to a suitable level according to the above. According to embodiments of the invention, the accumulation may be arranged to, alternatively or in addition, be performed for at least a first number of minutes, e.g. 15-60 minutes.

When it is determined in step 505 that the accumulated work $E_{engine}$ produced by the combustion engine has reached the limit $E_R$, or any other applied criteria has been fulfilled, the resulting accumulated measures $m_{outlet}$ and $m_{tail}$ are evaluated in step 506. According to the present example, it is also determined in step 505 whether the supplied amount of reagent $m_{urea}$ at least amount to $m_R$ described below in order to ensure that a sufficient amount of reagent has been supplied to allow sensor locations to be distinguished. The evaluation of sensor location in step 506 may, for example, be performed according to the following:

According to the disclosed example, the sensors may be deemed to be reversed (switched) if the accumulated masses over the first engine work, $E_R$, differs so that:

$$m_{tail} > C_R \times m_{outlet} \text{ for a given } m_{urea} > m_R$$

where:

$$m_{outlet} = \sum_{E_R} (dm_{outlet} \times po_{engine}),$$

$dm_{outlet}$ represents measured Engine Out NOx (according to what the system assumes is the emissions leaving the internal combustion engine) for a particular time period $t_i$ of the total time t during which the work $E_R$ is produced. Any suitable time periods $t_i$ can be used in the summation until the accumulated work from the combustion engine reaches $E_R$. In the present example, $dm_{outlet}$ is expressed in g/kWh, and engine power, $po_{engine}$, in kW.

Consequently, summation is performed during a time t it takes for the internal combustion engine to deliver the work $E_R$.

$$m_{tail} = \sum_{E_R}(dm_{tail} \times po_{engine}),$$

where $dm_{tail}$ represents measured $NO_x$ tailpipe/downstream SCR (according to the assumed sensor location) for a particular time period $t_i$ of the total time $t$ during which the work ER is produced, $t_i$ being same as or different from $t_i$ above, although accumulation is till performed for the same production of work from the internal combustion engine.

Similarly, the injected amount can be determined as:

$$m_{urea} = \sum_{E_R}(dm_{urea} \times t_i),$$

where $dm_{urea}$ represents urea dosage, e.g. expressed in g/h.

$dm_{urea}$ can be already present in the control system, or be determined directly from the control of e.g. injection nozzles. It is to be noted that it is the amount of urea, i.e. reagent, being supplied that is accumulated, and hence the supply of reagent may be higher. For example, the concentration of urea in adBlue is about 32.5%.

The factor $C_R$ can be determined as:

$$C_R \approx (\text{NOx sensor accuracy})^2 > 1.$$

For example, limit values according to the following can be used $E_R$=30 kWh, $m_R$=0.35 $m_{tail}$, and $C_R$=1.32 (sensor accuracy of 15%).

That is, $m_R/m_{tail}$ can be set to the equal the minimum $NO_x$ conversion efficiency being used, in this example 35%. Further, it takes one ammonium molecule to reduce one $NO_x$ molecule, and the well known chemistry regarding the reduction of $NO_x$ by $NH_3$ e.g. in regard of weight of additive being required for reduction of e.g. a gram of $NO_x$, is utilized in the above equations.

In sum, the measured $NO_x$ is integrated for both sensors, and then, subject to the requirements of the measurements, the quotient $m_{tail}/m_{outlet}$ cannot be greater than $C_R$ unless sensors are switched. If it is determined in step 507 that the quotient $m_{tail}/m_{outlet}$ is greater than $C_R$, the sensors are deemed to be switched in step 508. Otherwise the sensors are deemed to be correctly positioned in step 509. The method is then ended in step 510.

Consequently, according to the disclosed example, sensor location can be evaluated in a manner that accounts for e.g. differences due to tolerances by ensuring that the impact on measurements of the supply of additive will exceed the possible differences caused by tolerances so that an unambiguous result regarding actual sensor location can be obtained.

Finally, the present invention has been exemplified for a vehicle. The invention is, however, applicable in any kind of craft, such as, e.g., aircrafts, watercrafts and spacecrafts. The invention is also applicable for use in combustion plants. Also, the aftertreatment system may comprise further components such as one or more particle filters, one or more oxidation catalytic converters as is known per se. It is also contemplated that the aftertreatment system may comprise more than one SCR catalytic converter.

The invention claimed is:

1. A computer implemented method for diagnosing exhaust sensors subjected to exhaust gases resulting from combustion, wherein an aftertreatment system is arranged for reduction of at least one substance resulting from said combustion by supplying an additive comprising a reagent to an exhaust gas stream resulting from said combustion, wherein a first exhaust sensor is subjected to the exhaust gas stream and intended to measure an occurrence of said at least one substance at a location upstream of said supply of additive, and a second exhaust sensor being subjected to the exhaust gas stream and intended to measure an occurrence of said at least one substance at a location downstream of said supply of additive, the method comprising:

determining whether the locations of said first sensor and second sensor are reversed, the determination comprising:

determining, using one or more control units, if a second measurement value received from said second sensor exceeds a corresponding first measurement value received from said first sensor at least to a first extent; and when said second measurement value of said second sensor exceeds said corresponding first measurement value of said first sensor at least to said first extent, determining, using the one or more control units, that the locations of said first and second sensor are reversed, wherein said measurement values are determined when a supply of additive is set to obtain at least a first reduction of said at least one substance to be reduced; and providing an electronic indication, via the one or more control units, that the locations of said first and second sensor are reversed.

2. A computer implemented method according to claim 1, further comprising:

when it is determined that said first and second sensors are reversed, instructing said one or more control units to use sensor signals from said first sensor as though they are sensor signals from said second sensor, and sensor signals from said second sensor as though they are sensor signals from said first sensor.

3. A computer implemented method according to claim 1, further comprising:

utilizing signals from said first and second sensors in a control system controlling a plurality of functions via said one or more controllers; and when it is determined that said first and second sensors are reversed, instructing said one or more control units to use sensor signals from said first sensor as though they are sensor signals from said second sensor, and sensor signals from said second sensor as though they are sensor signals from said first sensor.

4. A computer implemented method according to claim 1, further comprising:

determining, using one or more control units, said first measurement value as an accumulation of an occurrence of said at least one substance to be reduced measured by said first sensor; and determining, using one or more control units, said second measurement value as an accumulation of an occurrence of said at least one substance to be reduced measured by said second sensor, said accumulation having a length in time.

5. A computer implemented method according to claim 4, wherein said length in time is determined, using one or more control units, by any one or more from the group:

a period of time, a period during which an accumulated work produced by an internal combustion engine amounts to a first amount of work during accumulation, or an accumulation of reagent and/or additive being supplied to the exhaust gas stream amounting at least to a first amount of reagent/additive.

6. A computer implemented method according to claim 1, further comprising:
setting, using one or more control units, said first reduction of said at least one substance to a level that is expected to result in a difference between said first and second measurement values exceeding differences that may be caused by tolerances in sensor accuracy of said first and second sensors.

7. A computer implemented method according to claim 1, further comprising:
setting, using one or more control units, said first reduction of said at least one substance to a level that results in a reduction of said at least one substance equivalent to a reduction, in percent, that at least equals or exceeds: $(((1,A)*(1,B))-1)*100$, where A is a tolerance in sensor accuracy of said first sensor expressed in percent, and B is a tolerance in sensor accuracy of said second sensor expressed in percent.

8. A computer implemented method according to claim 1, further comprising:
determining, using one or more control units, that the locations of said first and second sensors are reversed when the second measurement value of said second sensor exceeds the first measurement value of said first sensor at least by a factor equivalent to $(1,A)*(1,B)$, where A is a tolerance in sensor accuracy of said first sensor expressed in percent, and B is a tolerance in sensor accuracy of said second sensor expressed in percent.

9. A computer implemented method according to claim 1, further comprising, when reversing said signals form said first and second sensors, setting, using one or more control units, one or more trouble codes indicating faulty sensor locations of said first and second sensors.

10. A computer implemented method according to claim 1, wherein said additive being an additive at least partly comprising urea.

11. A computer implemented method according to claim 1, wherein said first and second sensors are sensors configured for measuring an occurrence of nitrogen oxides in said exhaust gas stream.

12. A system for diagnosing exhaust sensors subjected to exhaust gases resulting from combustion, wherein an aftertreatment system is arranged for reduction of at least one substance resulting from said combustion by supplying an additive comprising a reagent to an exhaust gas stream resulting from said combustion, wherein a first exhaust sensor is subjected to the exhaust gas stream and intended to measure an occurrence of said at least one substance at a location upstream said supply of additive, and a second exhaust sensor being subjected to the exhaust gas stream and intended to measure an occurrence of said at least one substance at a location downstream said supply of additive, the system comprising:
means for determining whether the locations of said first sensor and second sensor are reversed, wherein said means:
determine if a second measurement value of said second sensor exceeds a corresponding first measurement value of said first sensor at least to a first extent; and
when said second measurement value of said second sensor exceeds said corresponding first measurement value of said first sensor at least to said first extent, determine that the locations of said first and second sensor are reversed, wherein said measurement values are determined when a supply of additive is set to obtain at least a first reduction of said at least one substance to be reduced; and
means for providing an electronic indication, via the one or more control units that the locations of said first and second sensor are reversed.

13. A system according to claim 12, further comprising a catalytic converter is arranged downstream of said supply of additive and upstream an intended location of said second sensor.

14. A vehicle comprising a system for diagnosing exhaust sensors subjected to exhaust gases resulting from combustion, wherein an aftertreatment system is arranged for reduction of at least one substance resulting from said combustion by supplying an additive comprising a reagent to an exhaust gas stream resulting from said combustion, wherein a first exhaust sensor is subjected to the exhaust gas stream and intended to measure an occurrence of said at least one substance at a location upstream said supply of additive, and a second exhaust sensor being subjected to the exhaust gas stream and intended to measure an occurrence of said at least one substance at a location downstream said supply of additive, the system comprising:
means for determining whether the locations of said first sensor and second sensor are reversed, wherein said means:
determine if a second measurement value of said second sensor exceeds a corresponding first measurement value of said first sensor at least to a first extent;
when said second measurement value of said second sensor exceeds said corresponding first measurement value of said first sensor at least to said first extent, determine that the locations of said first and second sensor are reversed, wherein said measurement values are determined when a supply of additive is set to obtain at least a first reduction of said at least one substance to be reduced; and
provide an electronic indication, via the one or more control units that the locations of said first and second sensor are reversed.

15. A vehicle according to claim 14, wherein said system further comprises a catalytic converter arranged downstream of said supply of additive and upstream an intended location of said second sensor.

16. A computer program product comprising computer program code stored on a non-transitory computer-readable medium, said computer program product for diagnosing exhaust sensors subjected to exhaust gases resulting from combustion, wherein an aftertreatment system is arranged for reduction of at least one substance resulting from said combustion by supplying an additive comprising a reagent to an exhaust gas stream resulting from said combustion, wherein a first exhaust sensor is subjected to the exhaust gas stream and intended to measure an occurrence of said at least one substance at a location upstream of said supply of additive, and a second exhaust sensor being subjected to the exhaust gas stream and intended to measure an occurrence of said at least one substance at a location downstream of said supply of additive, said computer program product comprising computer instructions means for causing said at least on control unit to:
determine whether the locations of said first sensor and second sensor are reversed, the determination comprising:

determine if a second measurement value received from said second sensor exceeds a corresponding first measurement value received from said first sensor at least to a first extent; and when said second measurement value of said second sensor exceeds said corresponding first measurement value of said first sensor at least to said first extent, determine that the locations of said first and second sensor are reversed, wherein said measurement values are determined when a supply of additive is set to obtain at least a first reduction of said at least one substance to be reduced; and provide an electronic indication, via the one or more control units that the locations of said first and second sensor are reversed.

17. A computer program product according to claim 16, further comprising means for causing said at least on control unit to:

when it is determined that said first and second sensors are reversed, use sensor signals from said first sensor as though they are sensor signals from said second sensor, and sensor signals from said second sensor as though they are sensor signals from said first sensor.

18. A computer program product according to claim 16, further comprising means for causing said at least on control unit to:

utilizing signals from said first and second sensors in a control system controlling a plurality of functions; and when it is determined that said first and second sensors are reversed, use sensor signals from said first sensor as though they are sensor signals from said second sensor, and use sensor signals from said second sensor as though they are sensor signals from said first sensor.

\* \* \* \* \*